(12) United States Patent
Sherf et al.

(10) Patent No.: US 11,973,885 B2
(45) Date of Patent: Apr. 30, 2024

(54) SECURED DEPLOYMENT AND PROVISIONING OF WHITE-BOX BASED CLUSTER

(71) Applicant: DRIVENETS LTD., Raanana (IL)

(72) Inventors: Timor Sherf, Hadera (IL); Yuval Moshe, Ra'anana (IL); Eli Fedida, Avtalion (IL)

(73) Assignee: DRIVENETS LTD., Raanana (IL)

( * ) Notice: Subject to any disclaimer, the term of this patent is extended or adjusted under 35 U.S.C. 154(b) by 398 days.

(21) Appl. No.: 17/312,337

(22) PCT Filed: Nov. 16, 2019

(86) PCT No.: PCT/IL2019/051249
§ 371 (c)(1),
(2) Date: Jun. 9, 2021

(87) PCT Pub. No.: WO2020/121295
PCT Pub. Date: Jun. 18, 2020

(65) Prior Publication Data
US 2022/0052845 A1    Feb. 17, 2022

Related U.S. Application Data

(60) Provisional application No. 62/777,269, filed on Dec. 10, 2018.

(51) Int. Cl.
| | | |
|---|---|---|
| H04L 29/06 | (2006.01) | |
| H04L 9/08 | (2006.01) | |
| H04L 9/32 | (2006.01) | |
| H04L 9/40 | (2022.01) | |

(52) U.S. Cl.
CPC .......... H04L 9/3263 (2013.01); H04L 9/0894 (2013.01); H04L 63/0823 (2013.01); H04L 63/0876 (2013.01); H04L 2209/16 (2013.01)

(58) Field of Classification Search
None
See application file for complete search history.

(56) References Cited

U.S. PATENT DOCUMENTS

| | | |
|---|---|---|
| 8,316,438 B1 | 11/2012 | Bush |
| 2004/0098422 A1 | 5/2004 | Levesque et al. |
| 2012/0060027 A1* | 3/2012 | Vilhuber ............. H04L 63/0823 713/156 |
| 2018/0248770 A1* | 8/2018 | Regmi ................ G06F 9/45533 |

* cited by examiner

*Primary Examiner* — Andrew J Steinle
(74) *Attorney, Agent, or Firm* — Browdy and Neimark, PLLC

(57) ABSTRACT

A method for obtaining a secured routing functionality in a white-boxes based cluster which comprises a plurality of standalone white-boxes, wherein at least two of the standalone white-boxes were manufactured by different manufacturers, and wherein the method comprising identifying a serial number (S/N) associated with each white-box to be included in that cluster, determining pre-defined properties of each respective white-box based on the identification, and installing each of the white-boxes together with a respective computing platform software comprising a software agent provided by the manufacturer of that white-box.

5 Claims, 3 Drawing Sheets

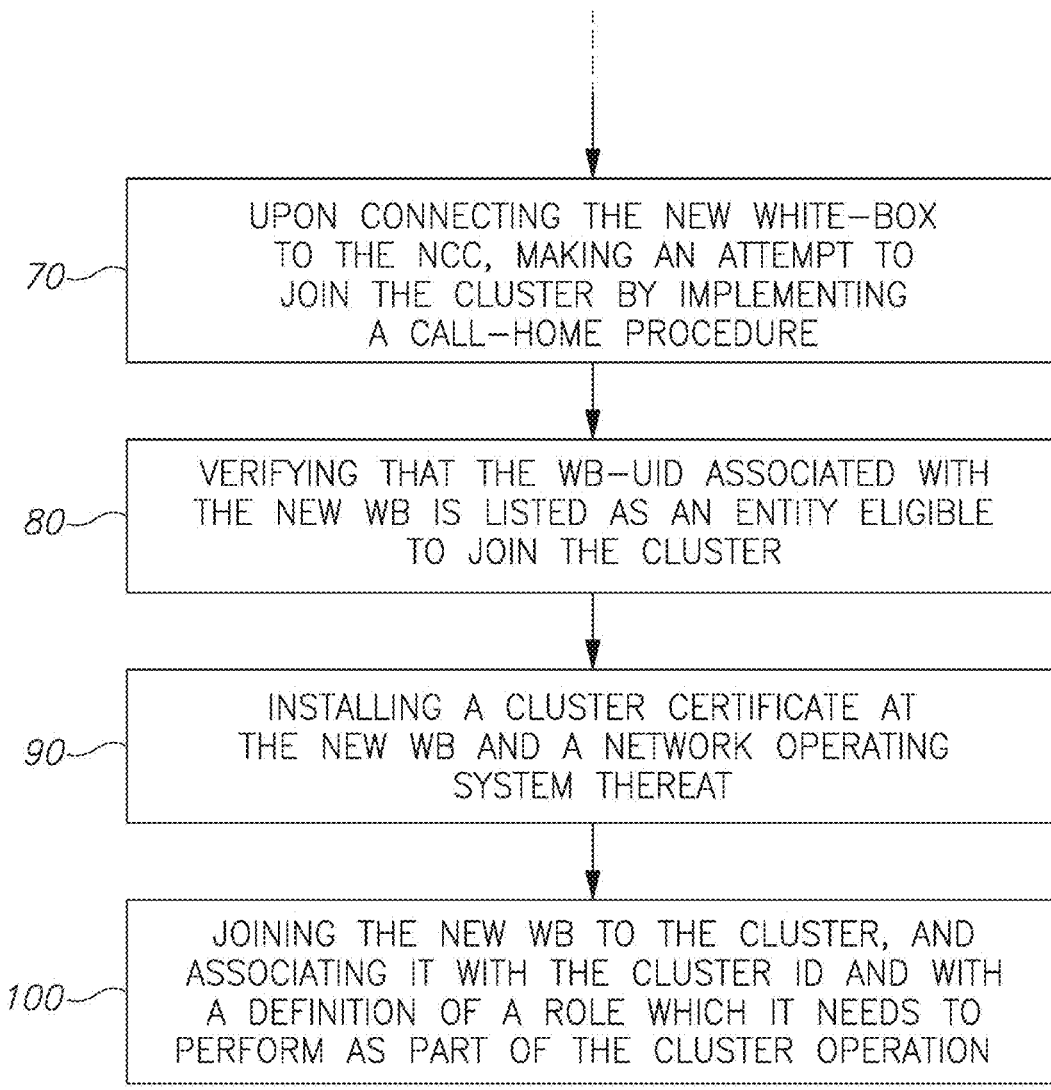
FIG.2 (cont. 1)

SECURED DEPLOYMENT AND PROVISIONING OF WHITE-BOX BASED CLUSTER

TECHNICAL FIELD

The present disclosure generally relates to the field of communication systems. More particularly, the present disclosure relates to secured deployment and provisioning process of virtual clusters.

Glossary

CA—Certificate Authority;
NC—Network Cloud;
NCC—Network Cloud Controller;
NCF—Network Cloud Fabric;
NCM network cloud manager;
NCP—Network Cloud Packet Forwarder;
NOS—Network Operating System;
ODM—Original Design Manufacturer;
ONIE—Open Network Install Environment;
OS—Operating System;
S/N—Serial Number;
WB—White-box;
WB-UID—White-box Unique Identifier; and
White-box—a commodity, being an off-the-shelf, open or industry-standard compliant hardware for switches and/or routers within the forwarding plane. White-boxes provide users with the foundational hardware elements of a network.

BACKGROUND

Deployment and provisioning processes that are carried out for disaggregated, white-box based virtual clusters, impose several security and operational risks. To name but few, the issues of securing cluster's boundaries, avoiding unauthorized joining attempts to the cluster, ensuring that a white-box that is being added to a cluster is certified and has the proper hardware and firmware revisions, authenticating and encrypting traffic being exchanged between white-boxes included within the same cluster, and the like.

The present disclosure seeks to provide a solution for white-boxes based clusters, operating in a secured manner.

SUMMARY

The disclosure may be summarized by referring to the appended claims.

It is an object of the present disclosure to provide a novel system and a method for providing a secured way for deploying and maintaining a cluster that comprises a plurality of standalone white-boxes used in order to obtain a functionality of a high-scale router.

It is another object of the present disclosure to provide a novel method for aggregating white-boxes obtained from various ODM vendors and managing them as a single entity using the vendor's Network Operating System (NOS) software in a secured manner while preserving cluster membership eligibility.

It is still another object of the present disclosure to provide a novel system and a method for managing a white-boxes based cluster.

It is another object of the present disclosure to provide a novel method for blocking attempts of unauthorized devices to join a white-boxes based cluster.

Other objects of the present disclosure will become apparent from the following description.

According to a first embodiment of the present disclosure, there is provided a method for obtaining a secured routing functionality in a white-boxes based cluster comprising a plurality of standalone white-boxes, wherein at least two of the standalone white-boxes were manufactured by different manufacturers, and wherein the method comprises identifying a serial number (S/N) associated with each white-box to be included in that cluster, determining pre-defined properties of each respective white-box based on that identification, and installing each of the white-boxes together with a respective computing platform software comprising a software agent provided by the manufacturer of that white-box.

The term "computing platform" as used herein throughout the specification and claims is used to denote an environment at which a software is being executed. It may be the hardware or the operating system (OS), or both, and associated with application programming interfaces or other underlying software, as long as the program code is executed with it. In fact, a computing platform may be considered as the stage at which computer programs can run.

In accordance with another embodiment, the method further comprising a step of confirming each white-box configuration and/or revision number, upon identifying the serial number associated with the white-box, thereby enabling that white-box to comply with NOS specifications and requirements.

By yet another embodiment, the method further comprising a step of associating each white-box with a Network Operating System (NOS) identification, which may optionally imply who is the manufacturer of each respective white-box.

According to still another embodiment, the computing platform software further comprises a certification provided by a manufacturer of a respective white-box, which may be used for confirming the white-box configuration and/or revision.

According to yet another embodiment the method provided comprises the steps of:

(a) identifying a new white-box as being a white-box that is about to be added to a cluster that comprises a plurality of standalone white-boxes;
(b) registering the new white-box at an installing entity of a platform orchestrator;
(c) connecting the new white-box to a network where the routing cluster, to which the new white-box is about to be added, is operative, and performing a call-home to the installing entity of the platform orchestrator;
(d) retrieving information from the white-box concerning at least one member of a group that consists of: a hardware model, a hash and a revision number, and verifying whether the retrieved information matches a pre-defined certified white-box hardware configuration;
(e) deploying a pre-defined platform software image to the new white-box, where the platform software image comprises an assigned WB-UID, and a new white-box manufacturer's security certificate;
(f) updating a respective network cloud manager that a new valid white-box unique identifier is being added to a list of white-boxes' unique identifiers;
(g) upon connecting the new white-box to the Network Cloud Controller (NCC), making an attempt to join the cluster by implementing a call-home process;

(h) verifying whether the WB-UID associated with the new white-box is listed as an entity that is eligible to join the specific cluster;

(i) upon verifying the white-box unique identifier, installing a cluster certificate at the new white-box and installing a network operating system (NOS) at the new white-box; and (j) joining the new white-box to the cluster, and associating the new white-box with a cluster ID and with a definition of a role which it needs to carry out while being a part of the cluster operation.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps, not all of which are required in all embodiments of the invention. The scope of the invention can be summarized by referring to the appended claims.

Figure 1:
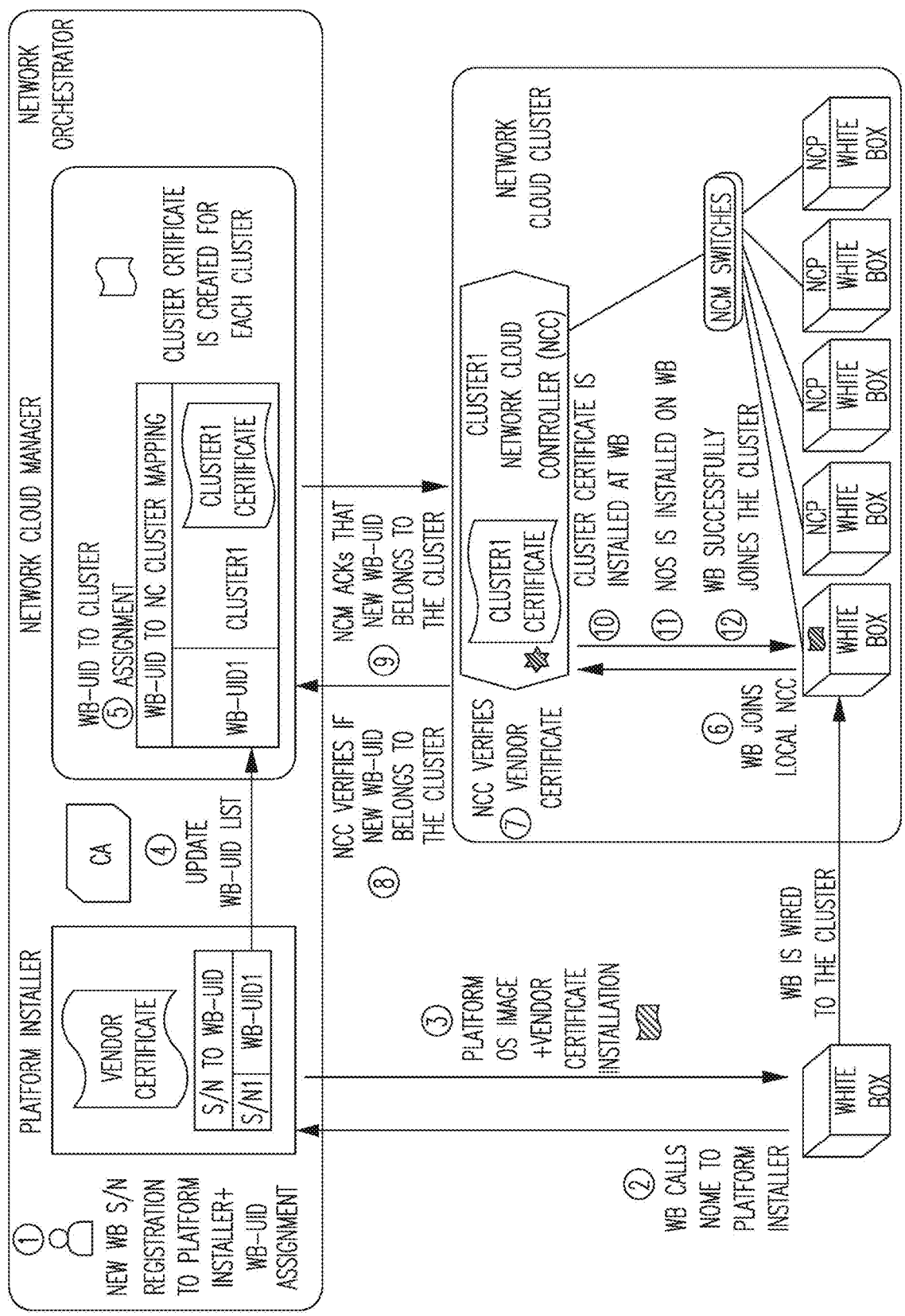
FIG. 1. illustrates a schematic overview of a network comprising a white-boxes based cluster, construed in accordance with an embodiment of the present invention, and stages to be taken to add a new white-box to that cluster.

FIG. 1 illustrates a schematic overview of a network comprising a white-boxes based cluster, construed in accordance with an embodiment of the present invention, and stages to be taken in order to add a new white-box to that cluster. The network cloud (1) illustrated in this figure comprises a network orchestrator (2) and a network cloud cluster (5). The network orchestrator (2) in turn comprises a platform installer (3) and a network cloud manager (4). The network cloud cluster (5) in turn comprises a local network cloud controller (6), a plurality of white-boxes (7) and network cloud management switches (8). The operation of these various elements is explained in details in the following example described in connection with FIG. 2.

Figure 2:
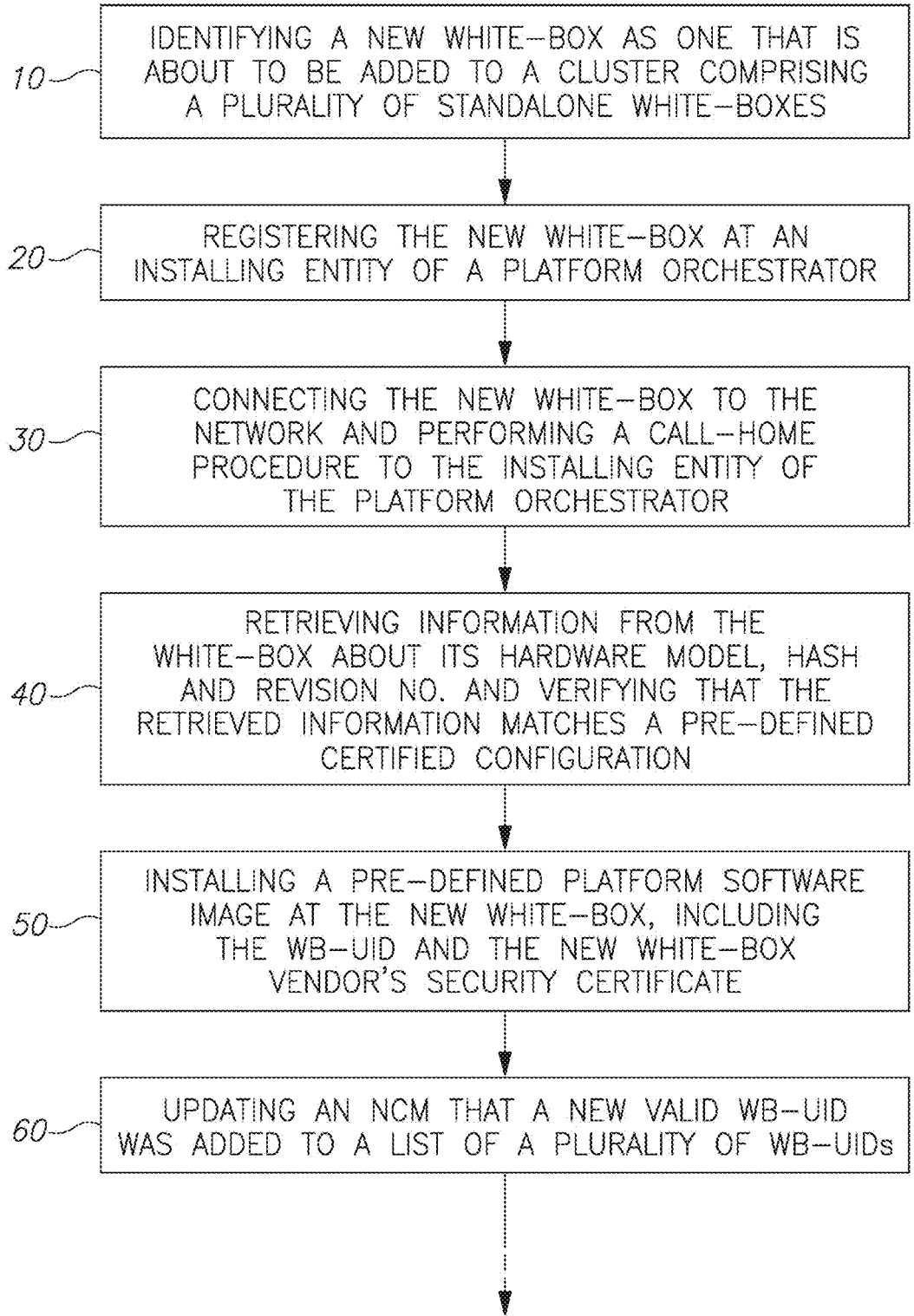
FIG. 2.—exemplifies a flow chart illustrating a method construed in accordance with an embodiment of the present disclosure.

FIG. 2 exemplifies a flow chart illustrating a method construed in accordance with an embodiment of the present disclosure. According to this embodiment as exemplified in FIG. 2, first, a new white-box is identified as being a white-box that is about to be added to a cluster that comprises a plurality of standalone white-boxes (step 10). Such an identification can be for example a visual identification made by an engineer, an operator, etc. The new white-box is then registered at the installer of a platform orchestrator (step 20). As part of the registration process, a White-box Unique Identifier (WB-UID) is assigned to the white-box and is automatically associated with the white-box' S/N (thereby linking the white-box S/N to the assigned WB-UID). Once registered, the platform installer waits for the white-box having the newly registered S/N, to call-home.

Next, the new white-box is connected to a network where the routing cluster, to which the new white-box is about to be added, is operative, and performs a call-home to the platform installer by using for example an Open Network Install Environment (ONIE) process (step 30). ONIE is an open source "install environment", that acts as an enhanced boot loader utilizing facilities in a Linux/BusyBox environment. This small Linux operating system allows end-users and channel partners to install the target network OS as part of data center provisioning, in a fashion that servers are provisioned.

The platform installer reads the hardware related information from the white-box, retrieves the hardware model, hash and revision therefrom and verifies that the retrieved information matches the pre-defined certified white-box hardware configuration (step 40). If the white-box hardware is determined to match the platform installer certification requirements, the process will continue.

Next, the platform installer deploys a pre-defined platform software image to the new white-box, where the platform software image further comprises the assigned WB-UID. In addition, the vendor's security certificate is preferably also installed at this stage (step 50).

The platform software installer updates the respective network cloud manager that a new valid white-box (WB-UID) was added to the list (step 50). A cluster is a logical entity defined and created by a network cloud management module. During its creation, a cluster is assigned with a unique cluster ID and a cluster certificate. The cluster is also assigned with a white-box eligible list of WB-UIDs that are qualified to join the cluster.

Once the new white-box is wired to the Network Cloud Controller (NCC), it makes an attempt to join the cluster by implementing a call-home process (step 60). This joining attempt is processed by the NCC in an isolated space in order to confirm that the new white-box is associated with a valid vendor certificate. On the other hand, if the joining attempt is made by an element (e.g. a white-box) which does not have a valid vendor certificate and a WB-UID, this attempt will be automatically rejected.

In the case that the new white-box is associated with a valid vendor certificate, the NCC verifies together with the respective network cloud manager (NCM) whether the WB-UID associated with the new white-box is listed as an entity that is eligible to join this specific cluster. The NCM needs to confirm at this stage that the new WB-UID indeed belongs to the cluster, in order to proceed to a step of cluster certificate installation (step 70). If the WB-UID is not listed as one that belongs to the specific cluster, the joining attempt will be rejected by the NCC.

Once the white-box WB-UID has been verified by the network cloud manager, the cluster certificate is installed at the new white-box by the NCC (step 80). Following the certificate installation, the NCC proceeds by installing the network operating system (NOS) at the new white-box (step 90).

Following that latter step, the new white-box successfully joins the cluster. It becomes associated with the cluster ID and with a definition of a role which it needs to carry out as being a part of the cluster operation (step 100). The white-box is then able to start functioning while complying with the role for which it was included in that cluster.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for obtaining a secured routing functionality in a white-boxes based cluster which comprises a plurality of standalone white-boxes, wherein at least two of said standalone white-boxes were manufactured by different manufacturers, and wherein said method comprising identifying a new white-box as a white-box that is about to be added to a cluster, registering said new white-box at an installer of a platform orchestrator, wherein as part of the registration process, a White-box Unique Identifier, WB-UID, is assigned to said new white-box and is automatically associated with said new white-box's serial number (S/N), performing by said new white-box a call home process to said installer, matching, by said installer, information that relates to said new white-box, with a pre-defined certified white-box hardware configuration, and if the new white-box hardware is determined to match the installer certification requirements, installing each said new white-box together with a respective computing platform software comprising a software agent provided by the manufacturer of that new white-box.

2. The method of claim 1, wherein said method further comprises a step of confirming each white-box configuration and/or revision number, upon identifying the serial number associated with said white-box.

3. The method of claim 2, wherein said method further comprises a step of associating each white-box with a Network Operating System (NOS) identification.

4. The method of claim 1, wherein said computing platform software further comprises a certification provided by a manufacturer of a respective white-box.

5. A method for obtaining a secured routing functionality in a white-boxes based cluster which comprises a plurality of standalone white-boxes, wherein at least two of said standalone white-boxes were manufactured by different manufacturers, and wherein said method comprising identifying a serial number (S/N) associated with each white-box to be included in said cluster, determining pre-defined properties of each respective white-box based on said identification, and installing each of said white-boxes together with a respective computing platform software comprising a software agent provided by the manufacturer of that white-box, wherein said method comprises the steps of:

(a) identifying a new white-box as being a white-box that is about to be added to a cluster that comprises a plurality of standalone white-boxes;

(b) registering the new white-box at an installing entity of a platform orchestrator;

(c) connecting the new white-box to a network where the routing cluster to which the new white-box is about to be added, is operative, and performing a call-home to the installing entity of a platform orchestrator;

(d) retrieving information from the white-box concerning at least one member of a group that consists of: a hardware model, a hash and a revision number, and verifying whether the retrieved information matches a pre-defined certified white-box hardware configuration;

(e) deploying a pre-defined platform software image to the new white-box, where the platform software image comprises an assigned WB-UID, and a new white-box manufacturer's security certificate;

(f) updating a respective network cloud manager that a new valid white-box unique identifier is being added to a list of white-boxes' unique identifiers;

(g) upon connecting the new white-box to the Network Cloud Controller (NCC), making an attempt to join the cluster by implementing a call-home process;

(h) verifying whether the WB-UID associated with the new white-box is listed as an entity that is eligible to join said specific cluster;

(i) upon verifying the white-box unique identifier, installing a cluster certificate at the new white-box and installing a network operating system (NOS) at the new white-box; and (j) joining the new white-box to the cluster, and associating the new white-box with a cluster ID and with a definition of a role which it needs to carry out while being a part of the cluster operation.

* * * * *